(12) United States Patent
Conover et al.

(10) Patent No.: US 10,678,965 B1
(45) Date of Patent: Jun. 9, 2020

(54) SYSTEMS AND METHODS FOR IDENTIFYING HIGH-CYCLE FATIGUE IN ROTATING STRUCTURES

(71) Applicant: Ansys, Inc., Canonsburg, PA (US)

(72) Inventors: David L. Conover, Pittsburgh, PA (US); Andrew C. Madden, Ann Arbor, MI (US); Viswanathan Sundar, McDonald, PA (US)

(73) Assignee: Ansys, Inc., Canonsburg, PA (US)

( * ) Notice: Subject to any disclaimer, the term of this patent is extended or adjusted under 35 U.S.C. 154(b) by 575 days.

(21) Appl. No.: 14/789,083

(22) Filed: Jul. 1, 2015

Related U.S. Application Data

(60) Provisional application No. 62/020,193, filed on Jul. 2, 2014.

(51) Int. Cl.
 *G06F 30/20* (2020.01)
 *G06T 17/00* (2006.01)

(52) U.S. Cl.
 CPC .............. *G06F 30/20* (2020.01); *G06T 17/00* (2013.01)

(58) Field of Classification Search
 CPC ...... G06F 17/5009; G06F 30/20; G06T 17/00
 See application file for complete search history.

(56) References Cited

U.S. PATENT DOCUMENTS

| | | | | |
|---|---|---|---|---|
| 5,993,161 | A | * | 11/1999 | Shapiro ................... F01D 25/04 29/404 |
| 2016/0160842 | A1 | * | 6/2016 | Pern ndez De Velasco Munoz .................. F03D 7/0292 703/7 |
| 2018/0174068 | A1 | * | 6/2018 | Dahl ..................... G06N 99/005 |

OTHER PUBLICATIONS

Susmel et al. "Estimating fatigue damage under variable amplitude multiaxial fatigue loading." Fatigue and Fracture of Engineering Materials and Structures, vol. 34 (2011), pp. 1053-1077, doi: 10.1111/j.1460-2695.2011.01594.x [retrieved on Aug. 16, 2017]. Retrieved from STIC.*

Nicholas, T. "High cycle fatigue: a mechanics of materials perspective." Oxford: Elsevier (2006), ISBN: 9780080446912 [retrieved on Aug. 11, 2017]. Retrieved from STIC.*

(Continued)

*Primary Examiner* — Aniss Chad
*Assistant Examiner* — Alfred H B Wechselberger
(74) *Attorney, Agent, or Firm* — Jones Day

(57) ABSTRACT

Systems and methods are provided for simulating high-cycle fatigue of a rotating component. A first three-dimensional geometric representation of a rotating component is received, where the first three-dimensional geometric representation is indicative of the rotating component during operation. A three-dimensional fluid flow metric is computed at points of the first three-dimensional geometric representation and stored in a first data structure. A second three-dimensional geometric representation of the rotating component is received, where the second three-dimensional geometric representation is indicative of the rotating component in a still configuration. A static metric is computed at points of the second three-dimensional geometric representation and stored in a second data structure. A combined data structure is populated based on the three-dimensional fluid flow metric from the first data structure and the static metric from the second data structure. A forced response solution of the rotating component is computed using the combined data structure.

20 Claims, 7 Drawing Sheets

(56) References Cited

OTHER PUBLICATIONS

Alshroof, el al. "Computational Fluid Dynamic Analysis of a Vibrating Turbine Blade." International Journal of Rotating Machinery, vol. 2012, Article ID 246031, doi: 10.1155/2012/246031 [retrieved on Aug. 15, 2017]. Retrieved from <https://www.hindawi.com/journals/ijrm/2012/246031/abs/>.*

Slone et al. "Dynamic fluid-structure interaction using finite volume unstructured mesh procedures." Computers and Structures, vol. 80 (2002), pp. 371-390 [retrieved on Aug. 15, 2017]. Retrieved from <http://www.sciencedirect.com/science/article/pii/S0045794901001778>.*

Morel, F. "A critical plane approach for life prediction of high cycle fatigue under multiaxial variable amplitude loading." International Journal of Fatigue, vol. 22 (2000), pp. 101-119 [retrieved on Aug. 16, 2017]. Retrieved from <http://www.sciencedirect.com/science/article/pii/S0142112399001188>.*

Elseifi, et al. "Directional Simulation for the Probabilistic Analysis of High Cycle Fatigue in Jet Engine Blades." 43rd AIAA/ASME/ASCE/AHS/ASC Structures, Structural Dynamics, and Materials Conference Apr. 22-25, 2002: Denver, Colorado [retrieved on Aug. 15, 2017]. Retrieved from <https://arc.aiaa.org/doi/pdfplus/10.2514/6.2002-1709>.*

"ANSYS Workbench—Simulation Introduction". [training manual] Release 9.0, 3rd Edition (2005): Ansys Inc., Chapter 8 (Results Postprocessing) [retrieved on Aug. 17, 2017]. Retrieved from <http://www-eng.lbl.gov/~als/FEA/ANSYS_V9_INFO/Workbench_Simulation_9.0_Intro_3rd_Edition/ppt/AWS90_Ch08_Results.ppt>.*

Benra et al. "A Comparison of One-Way and Two-Way Coupling Methods for Numerical Analysis of Fluid-Structure Interactions" Journal of Applied Mathematics, vol. 2011; doi: 10.1155/2011/853560 [retrieved on Mar. 4, 2017]. Retrieved from <https://www.hindawi.com/journals/jam/2011/853560/abs/>.*

Kuntz et al. "Simulation of Fluid-Structure Interactions in Aeronautical Applications" [presentation] 3rd FENET Annual Industry Meeting (2003); ANSYS [retrieved on Mar. 4, 2018]. Retrieved from <https://www.nafems.org/downloads/FENet_Meetings/Hamburg_Germany_Dec2003/FENET_Hamburg_Dec2003_Kuntz_AnsysCfx.pdf>.*

Bazilevs et al. "3D simulation of wind turbine rotors at full scale. Part I: Geometry modeling and aerodynamics" International Journal for Numerical Methods in Fluids [retrieved on Mar. 4, 2018]. Retrieved from <http://onlinelibrary.wiley.com/doi/10.1002/fld.2400/full>.*

Dhopade et al. "High-Cycle Fatigue of Fan Blades Accounting for Fluid-Structure Interaction" Proceedings of ASME Turbo Expo, Copenhagen, Denmark [retrieved on Feb. 14, 2019]. Retrieved from STIC. (Year: 2012).*

Tezduyar et al. "Space-time finite element techniques for computation of fluid-structure interactions" Computer methods in applied mechanics and engineering, vol. 195, pp. 2002-2027 [retrieved on Feb. 13, 2019]. Retrieved from <https://www.sciencedirect.com/science/article/pii/S0045782505001957> (Year: 2006).*

Sadeghi et al. "Coupled Fluid-Structure Simulation for Turbomachinery Blade Rows" AIAA2005-18, 43rd AIAA Aerospace Sciences Meeting and Exhibit, Reno, Nevada [retrieved on Feb. 13, 2019]. Retrieved from <https://arc.aiaa.org/doi/pdf/10.2514/6.2005-18> (Year: 2005).*

Arnold et al. "Simulation of Fluid-Structure-Interaction on Tidal Current Turbines Based on Coupled Multibody and CFD Methods" Proceedings of the 23rd ISOPE, ISBN: 978-1-880653-99-9 [retrieved on Feb. 13, 2019]. Retrieved from <https://www.onepetro.org/conference-paper/ISOPE-I-13-101?event-fire=false> (Year: 2013).*

Hsu et al. "Fluid-structure interaction modeling of wind turbines: simulating the full machine" Computational Mechanics, vol. 50, Iss. 6, pp. 821-833 [retrieved on Feb. 13, 2019]. Retrieved from <https://link.springer.com/article/10.1007/s00466-012-0772-0> (Year: 2012).*

Dayi et al. "A probability method for prediction on High Cycle Fatigue of blades caused by aerodynamic loads" Advances in Engineering Software, vol. 42, pp. 1059-1073 [retrieved on Feb. 13, 2019]. Retrieved from <https://www.sciencedirect.com/science/article/pii/S0965997811002055> (Year: 2011).*

"ANSYS CFX Reference Guide" Release 14.0, Chapter 5 and 12, SAS, IP, Inc. [retrieved on Feb. 15, 2019]. Retrieved from <http://read.pudn.com/downloads500/ebook/2077964/cfx_ref.pdf> (Year: 2011).*

Dhopade et al. "Fluid-Structure Interaction of Gas Turbine Blades" 17th Australasian Fluid Mechanics Conference, Auckland, New Zealand [retrieved on Feb. 13, 2019]. Retrieved from <https://people.eng.unimelb.edu.au/imarusic/proceedings/17/252_Paper.pdf> (Year: 2010).*

Hurty et al. "Dynamic Analysis of Structural Systems Using Component Modes" AIAA Journal, vol. 3, No. 4, pp. 678-685 [retrieved on Aug. 6, 2019]. Retrieved from <https://arc.aiaa.org/doi/pdf/10.2514/3.2947> (Year: 1965).*

Rieger, N. "Damping Properties of Steam Turbine Blades" Chapter 11.5, pp. 515-541 [retrieved on Aug. 9, 2019]. Retrieved on <https://rd.springer.com/chapter/10.1007/978-3-7091-2846-6_20> (Year: 1988).*

Hall et al. "A Deforming Grid Variational Principle and Finite Element Method for Computing Unsteady Small Disturbance Flows in Cascades" AIAA 92-0665, 30th Aerospace Sciences Meeting and Exhibit, Reno, NV [retrieved on Aug. 11, 2019]. Retrieved from <https://arc.aiaa.org/doi/pdf/10.2514/3.11701> (Year: 1992).*

Alshroof et al. "Computational Fluid Dynamic Analysis of a Vibrating Turbine Blade" International Journal of Rotating Machinery, vol. 2012, Article ID 246031, doi: 10.1155/2012/246031 [retrieved on Aug. 15, 2017]. Retrieved from <https://www.hindawi.com/journals/ijrm/2012/246031/> (Year: 2012).*

Smith, T. "A Modal Aeroelastic Analysis Scheme for Turbomachinery Blading" NASA-CR-187089, pp. 33-56 [retrieved on Jan. 29, 2020]. Retrieved from <https://ntrs.nasa.gov/archive/nasa/casi.ntrs.nasa.gov/19910011825.pdf> (Year: 1991).*

Sadeghi et al. "Coupled Fluid-Structure Simulation for Turbomachinery Blade Rows" AIAA 2005-18, 43rd AIAA Aerospace Sciences Meeting and Exhibit, Reno, NV [retrieved on Feb. 13, 2019]. Retrieved from <https://arc.aiaa.org/doi/abs/10.2514/6.2005-18> (Year: 2005).*

Seinturier et al. "A New Aeroelastic Model for Mistuned Bladed Disks" AIAA-2002-1533, 43rd AIAA Structures, Struc. Dynamics, and Materials Conf.; Denver, CO [retrieved on Aug. 11, 2017]. Retrieved from <https://arc.aiaa.org/doi/pdfplus/10.2514/6.2002-1533> (Year: 2002).*

Hall et al. "Linearized Euler Predictions of Unsteady Aerodynamic Loads in Cascades" AIAA Journal, vol. 31, No. 3 [retrieved on Aug. 11, 2019]. Retrieved from <https://arc.aiaa.org/doi/abs/10.2514/3.11363> (Year: 1993).*

* cited by examiner

SYSTEMS AND METHODS FOR IDENTIFYING HIGH-CYCLE FATIGUE IN ROTATING STRUCTURES

CROSS-REFERENCE TO RELATED APPLICATIONS

This application claims priority to U.S. Provisional Patent Application No. 62/020,193, filed Jul. 2, 2014, entitled "Systems and Methods for Identifying High-Cycle Fatigue in Rotating Structures," the entirety of which is herein incorporated by reference.

FIELD

This disclosure is related generally to system simulation and more particularly to multi-module combined simulation.

BACKGROUND

Simulation of non-static system behavior tends to be highly complex. While components of a system have properties in a static state (e.g., an unmoving state at room temperature), those components can have very different properties in an operational state. To provide accurate modeling of non-static systems, it may be desirable to consider properties of components in multiple different states as well as interactions among those components.

SUMMARY

Systems and methods are provided for simulating high-cycle fatigue of a rotating component. A first three-dimensional geometric representation of a rotating component is received, where the first three-dimensional geometric representation is indicative of the rotating component during operation. A three-dimensional fluid flow metric is computed at points of the first three-dimensional geometric representation based on the first three-dimensional geometric representation and stored in a first data structure. A second three-dimensional geometric representation of the rotating component is received, where the second three-dimensional geometric representation is indicative of the rotating component in a still configuration. A static metric is computed at points of the second three-dimensional geometric representation based on the second three-dimensional geometric representation and stored in a second data structure. A combined data structure is populated based on the three-dimensional fluid flow metric from the first data structure and the static metric from the second data structure. A forced response solution indicative of high-cycle fatigue of the rotating component is computed using the combined data structure.

As another example, a computer-implemented system for simulating high-cycle fatigue of a rotating component includes one or more data processors. One or more computer-readable mediums are encoded with a first three-dimensional geometric representation data structure associated with a rotating component, where the first three-dimensional geometric representation data structure is indicative of the rotating component during operation and a second three-dimensional geometric representation data structure associated with the rotating component, where the second three-dimensional geometric representation data structure is indicative of the rotating component in a still configuration. The one or more computer-readable mediums further include instructions for commanding the one or more data structures to perform steps including computing a three-dimensional fluid flow metric at points of the first three-dimensional geometric representation based on the first three-dimensional geometric representation data structure and storing the three-dimensional fluid flow metric in a first data structure, computing a static metric at points of the second three-dimensional geometric representation based on the second three-dimensional geometric representation data structure and storing the static metric in a second data structure, populating a combined data structure based on the three-dimensional fluid flow metric from the first data structure and the static metric from the second data structure, and computing a forced response solution indicative of high-cycle fatigue of the rotating component using the combined data structure.

DETAILED DESCRIPTION

High-cycle fatigue (HCF) is a major issue for rotating bladed components, such as turbines, compressors, and turbochargers. These structures operate in a highly stressed, high temperature, high vibration environment where premature catastrophic failure is highly undesirable. The vibratory loads on a bladed component stem primarily from the flow of fluid (e.g., air, liquid) through the blades. Upstream and downstream structures, such as vanes, struts, stators, and nozzles induce a regular forcing beat on the blades (e.g. an engine order excitation) that causes the blades and their connecting disk to vibrate. In addition, variances in the blades can cause interactions among the blades themselves. Systems and methods are described herein for modeling the interactions among rotating components, such as turbine blades, with their environment as well as among themselves.

Figure 1:
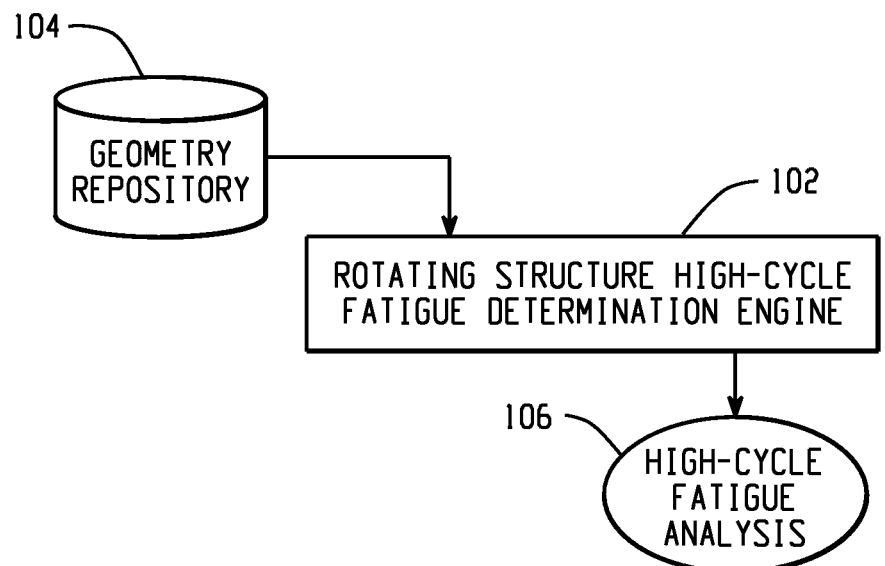
FIG. 1 is a block diagram depicting a computer-implemented rotating structure high-cycle fatigue determination engine.

FIG. 1 is a block diagram depicting a computer-implemented rotating structure high-cycle fatigue determination engine. The engine 102 accesses component geometry data from a repository 104, where a component represents one portion of an entire system. In one example, a component represented in the geometry repository 104 represents a turbine of a jet engine. In other examples, the component represents a compressor, turbocharger, or other rotating component. In still other examples, the component represents a physical component of a larger system.

The rotating structure high-cycle fatigue determination engine 102 accesses one or more geometric representations of a component from the geometry repository 104. For example, the engine 102 may access a first geometric representation of the component that represents characteristics of the component when that component is in operation (e.g., a representation of a turbine blade while it is rotating and at an operational heat level). The engine 102 may further access a second geometric representation of the component that represents characteristics of the component when that component is in a still configuration (e.g., a representation of the turbine blade while it is still and at room temperature). Certain analyses are performed by the engine 102 on the geometric representations separately, with the results of those analyses being combined, such as in a combined data structure, where that combined data structure is used in computing a forced response solution indicative of high-cycle fatigue of the rotating component, as indicated at 106. That high-cycle fatigue analysis 106 can simulate fatigue caused by rotation of a single component (e.g., a single turbine blade), multiple instances of a single component (e.g., a set of identical blades of a turbine), or multiple differing components (e.g., blades of a turbine that differ from one another based on wear or differences in manufacture).

Figure 2:
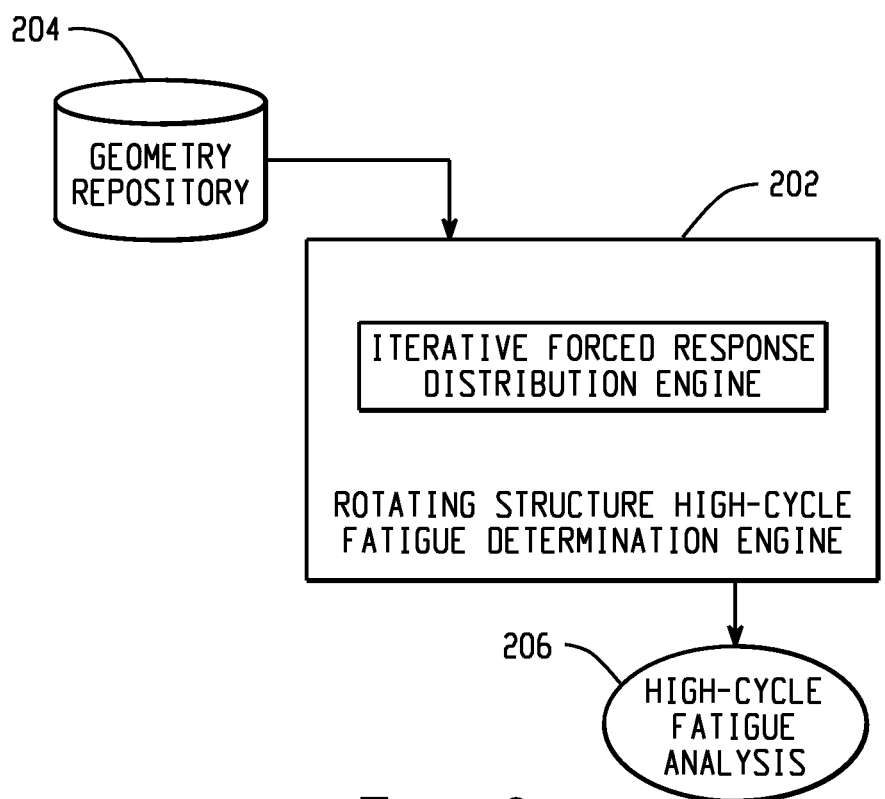
FIG. 2 is a block diagram depicting a rotating structure high-cycle fatigue determination engine that performs multiple high-cycle fatigue analyses.

FIG. 2 is a block diagram depicting a rotating structure high-cycle fatigue determination engine that performs multiple high-cycle fatigue analyses. The engine 202 of FIG. 2 facilitates performance of multiple sets of high-cycle fatigue analyses to identify likely performance characteristics of a system. In one example, the geometry repository 204 includes three-dimensional geometric representations of multiple variations of a common component, such as varying blades of a turbine. The engine 202 selects a set of varying blades to make up a turbine. The engine 202 accesses geometry information for each selected blade from the repository 204. The engine 202 analyzes the selected blades independently based on the accessed geometry information and then analyzes the set of blades collectively to investigate interactions among the selected blades during operation. The engine 202 outputs a high-cycle fatigue analysis 206 for that selected set of blades. The generation of a high-cycle fatigue analysis 206 can then be repeated for a new selected set of turbine blades. The new selected of blades are each analyzed independently and then collectively to generate a second high-cycle fatigue analysis. This process may be repeated as many times as desired, for example, as part of a Monte Carlo analysis, where random sets of varying blades are selected and then analyzed to generate a set of high-cycle fatigue analyses that collectively show likely areas of potential fatigue in the blades of the turbine over many cycles of use.

Figure 3:
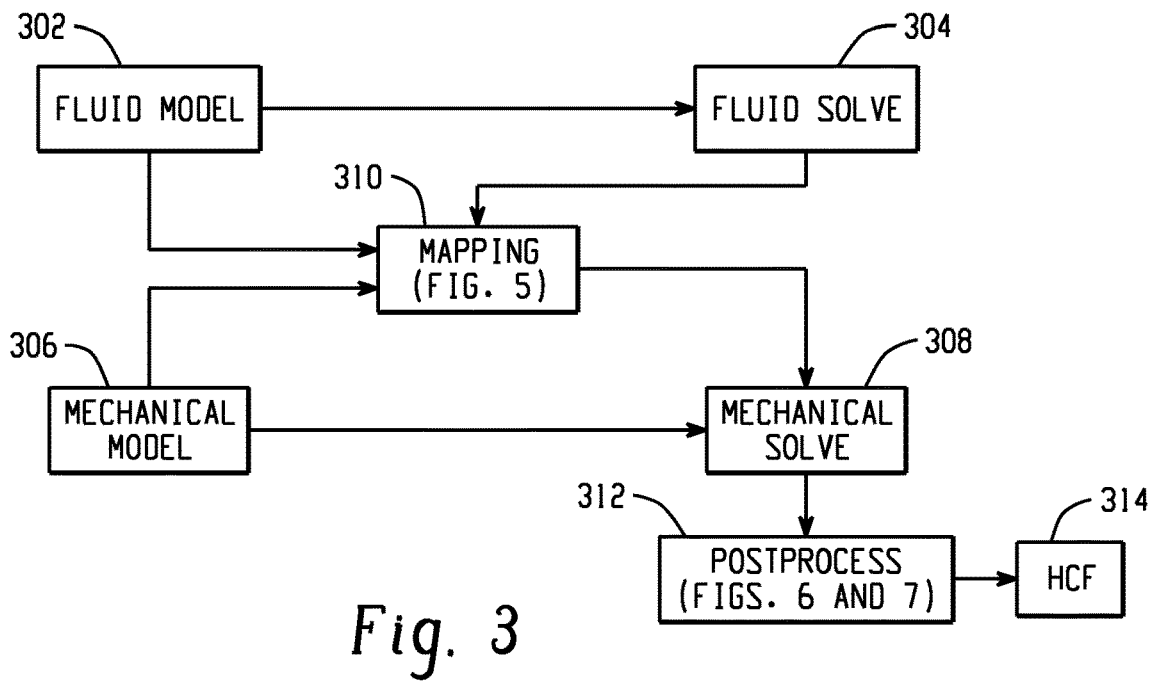
FIG. 3 is a block diagram depicting example processes performed by a rotating structure high-cycle fatigue determination engine.

FIG. 3 is a block diagram depicting example processes performed by a rotating structure high-cycle fatigue determination engine. The engine selects a single rotating component, such as one of a plurality of turbine blades that vary in state, such as based on wear, material variability, or manufacture tolerances. The engine performs a two-part analysis to determine characteristics of that selected rotating component on its own. At 302, the engine generates a fluid model of the selected component. The fluid model is based on characteristics of the selected component when it is in an operational state, such as when that component is rotating at its operational heat level. The engine receives a first three-dimensional geometric representation of the selected component that is representative of the rotating component during operation. At 304, the fluid domain of the selected component is built and solved to generate a three-dimensional fluid flow metric at points of the first three-dimensional geometric representation, with that metric being stored in a first data structure. The fluid solve process at 304 determines, for example, oscillatory pressures on the selected component (e.g., a turbine blade) and stores those pressures as the three-dimensional fluid flow metric in the first data structure.

At 306, the engine generates a mechanical model of the selected component. The mechanical model is based on characteristics of the selected component when it is in a still configuration, such as when that component is not moving and is at room temperature. The engine receives a second three-dimensional geometric representation of the rotating component that is indicative of the rotating component in a still configuration (this geometry may differ than the operational geometry, such as based on thermal expansion at operational temperature). At 308, a static metric is computed at points of the second three-dimensional geometric representation, with that static metric being stored in a second data structure. The mechanical solve process at 308 determines, for example, metrics associated with a prestressed static analysis and a linear perturbation analysis and stores those metrics in the second data structure.

At 310, data from the first data structure and data from the second data structure are used to populate a combined data structure. Because the geometries of the operational configuration of the component and the still configuration of component will differ in many cases, a process is performed at 310 to incorporate data from the first data structure and the second data structure into a common mesh (e.g., a common three-dimensional data structure, such as an array). The mapping process at 310 generates an array that contains data at common points of the first three-dimensional representation and the second three-dimensional representation. The process at 310, in one example, incorporates data from the first data structure into the second data structure via interpolation, such that the combined data structure is the second data structure with data from the first data structure incorporated into it. In another example, a combined data structure that is separate from the first data structure and the second data structure is populated based on data (e.g., interpolated data) from the first and second data structures. Having populated the combined data structure at 310, the mechanical solve engine 308 computes a forced response solution that is indicative of high-cycle fatigue of the rotating component using the combined data structure.

The results of that solution are provided for post-processing at 312. That post-processing process can include combining modes from the mechanical solve process 308 to obtain metrics associated with interactions among multiple selected blades based on combined data structures associated with individual blades. For example, stresses and strains on a turbine that comprises a set of selected varying blades are computed at 312 to generate full 360 degree turbine results. In another example, only principal stresses are computed, a simplified procedure that facilitates more time-efficient calculations, an important factor in iterative processes, such as Monte Carlo simulation. The post-processing engine 312 outputs a set of high-cycle fatigue analysis 314 that identifies likely areas of high-cycle fatigue for the selected set of rotating components.

Figure 4:
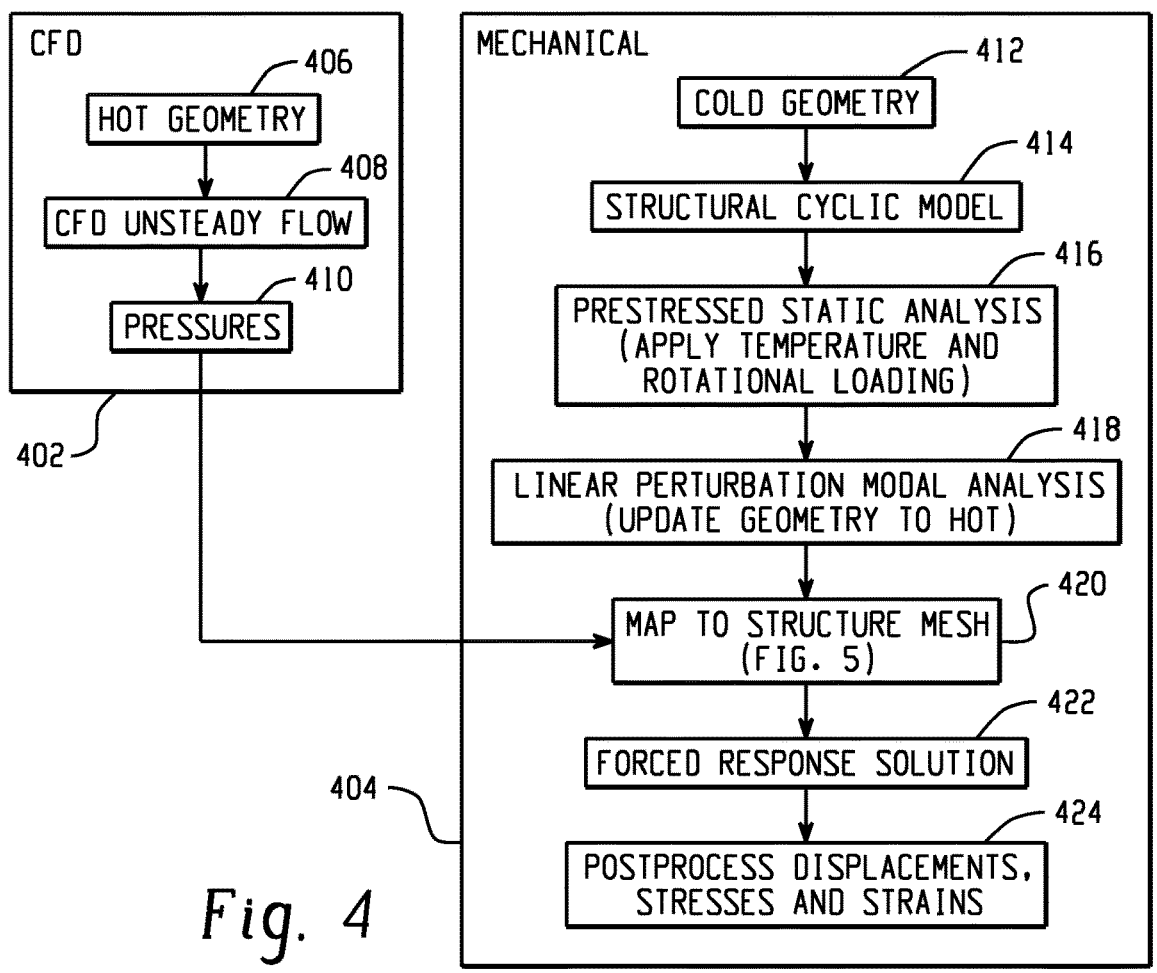
FIG. 4 is a block diagram depicting example details of certain processes of a rotating structure high-cycle fatigue determination engine.

FIG. 4 is a block diagram depicting example details of certain processes of a rotating structure high-cycle fatigue determination engine. The diagram includes a computational fluid dynamics (CFD) engine 402 that performs aspects of the fluid model 302 and fluid solve 304 processes depicted in FIG. 3. The diagram further includes a mechanical engine 404 that performs aspects of the mechanical model 306, mechanical solve 308, and mapping 310 processes of FIG. 3. Specifically, the CFD engine 402 accesses a "hot geometry" of a selected component at 406, where that hot geometry is a first three-dimensional geometric representation of the selected rotating component that is indicative of that rotating component during operation. This geometry is optimized for fluid flow and energy metric determination. Using the hot geometry, an unsteady (oscillating) flow field 408 and pressures 410 are determined and stored in a first data structure.

The mechanical engine 404 accesses a "cold geometry" of the selected component at 412. The cold geometry is a second three-dimensional geometric representation of the selected component that is indicative of that component when it is no longer spinning and is cooled down to room temperature. At 414, a cyclic model is generated from a full, 360 degree geometry, and a prestressed static analysis is performed at 416 under operating conditions (e.g., rotating speed and temperature). The resulting deformation is added to the cold geometry to obtain an updated configuration. In some cases, this geometry is the same as the hot geometry used by the CFD engine at 406. At 418, a linear perturbation model analysis is performed using the updated geometry and stress state from 416. The process at 418 obtains the natural frequencies and mode shapes of the prestressed structures, which are stored in a second data structure. At 420, the pressures 410 from the CFD engine 402 in the first data structure are mapped to the updated geometry in the second data structure (e.g., where the data from the first data structure and the second data structure are used to populate a combined data structure, which may be the second data structure or a wholly separate data structure), and a harmonic forced response analysis is performed across the frequency range of interest at 422. At 424, the results of that harmonic forced response analysis 422 are provided for post-processing for determination of displacements, stresses, and strains.

Figure 5:
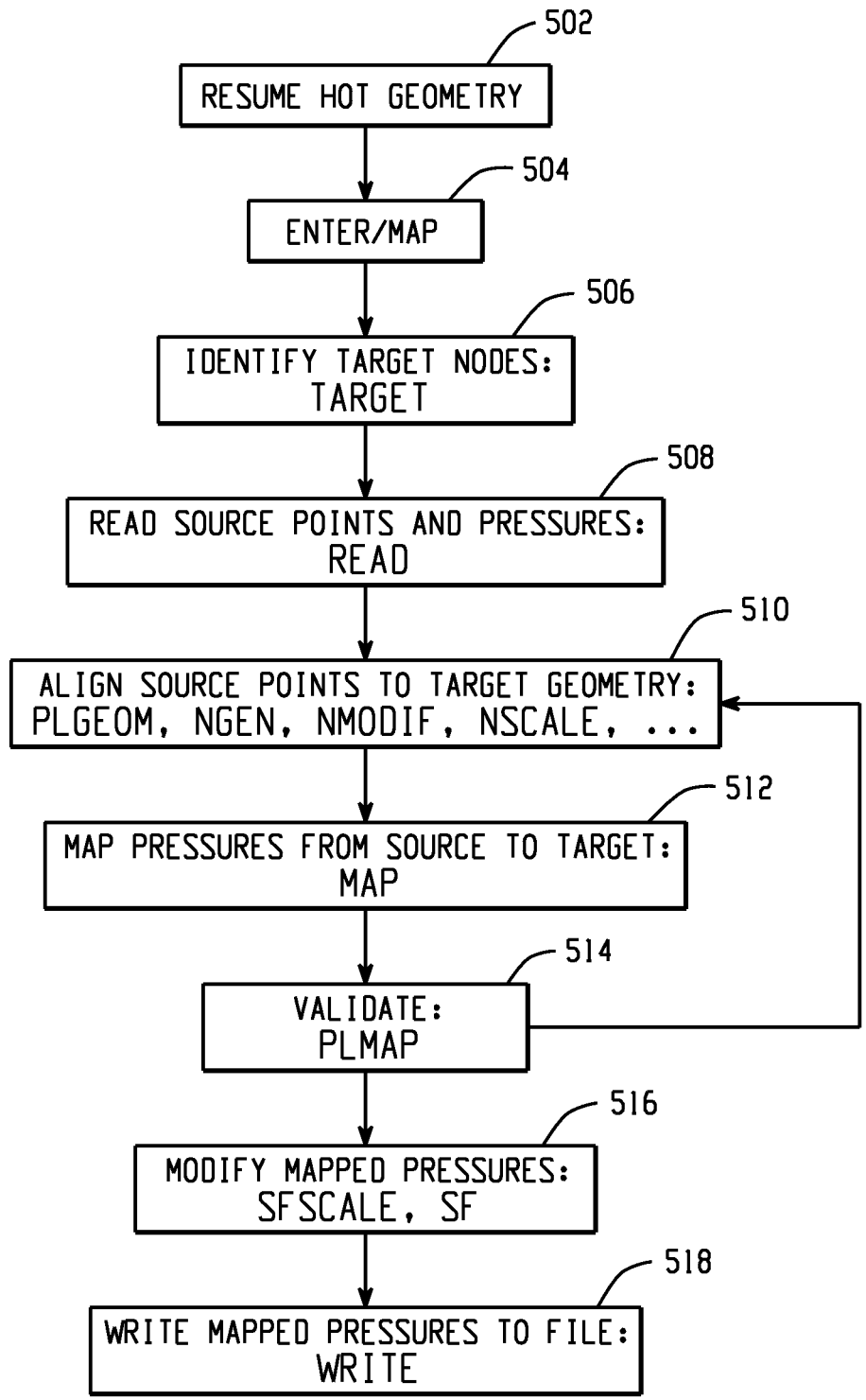
FIG. 5 is a flow diagram depicting example details of a mapping process between data from a CFD engine and data from a mechanical engine.

FIG. 5 is a flow diagram depicting example details of a mapping process between data from a CFD engine and data from a mechanical engine. At 502, a mechanical engine 404 hot geometry (e.g., the geometry generated at 418 of FIG. 4 that is stored in the second data structure) is accessed and provided to a mapping processor at 504. At 506, target nodes of the mechanical engine hot geometry are identified (e.g., nodes on the surface of a blade component to which data from the CFD engine's first data structure are to be mapped). At 508, first data structure data from the CFD engine (e.g., source nodes and pressures 410) are accessed, such as from an external text file via a READ command. At 510, the nodes from the first data structure are mapped to the target nodes of the second data structure, such as via linear interpolation. At 512, pressures from the source points in the first data structure are populated into a combined data structure having mechanical data from the second data structure at the target nodes. At 514, a graphical user interface may be provided to a user for visual verification that the mapping was accurate. If the user is not pleased with the mapping, parameters may be adjusted and the alignment and mapping may be repeated at 510, 512. Once alignment is visually confirmed at 514, the pressures may be scaled if necessary at 516, such as if the units utilized by the CFD engine 402 are different from those to be utilized by the mechanical engine in determining the mechanical solution (e.g., at 422). The combined data structure containing mapped data from the CFD engine 402 first data structure and the mechanical engine 404 second data structure is written to a file at 518.

Figure 6:
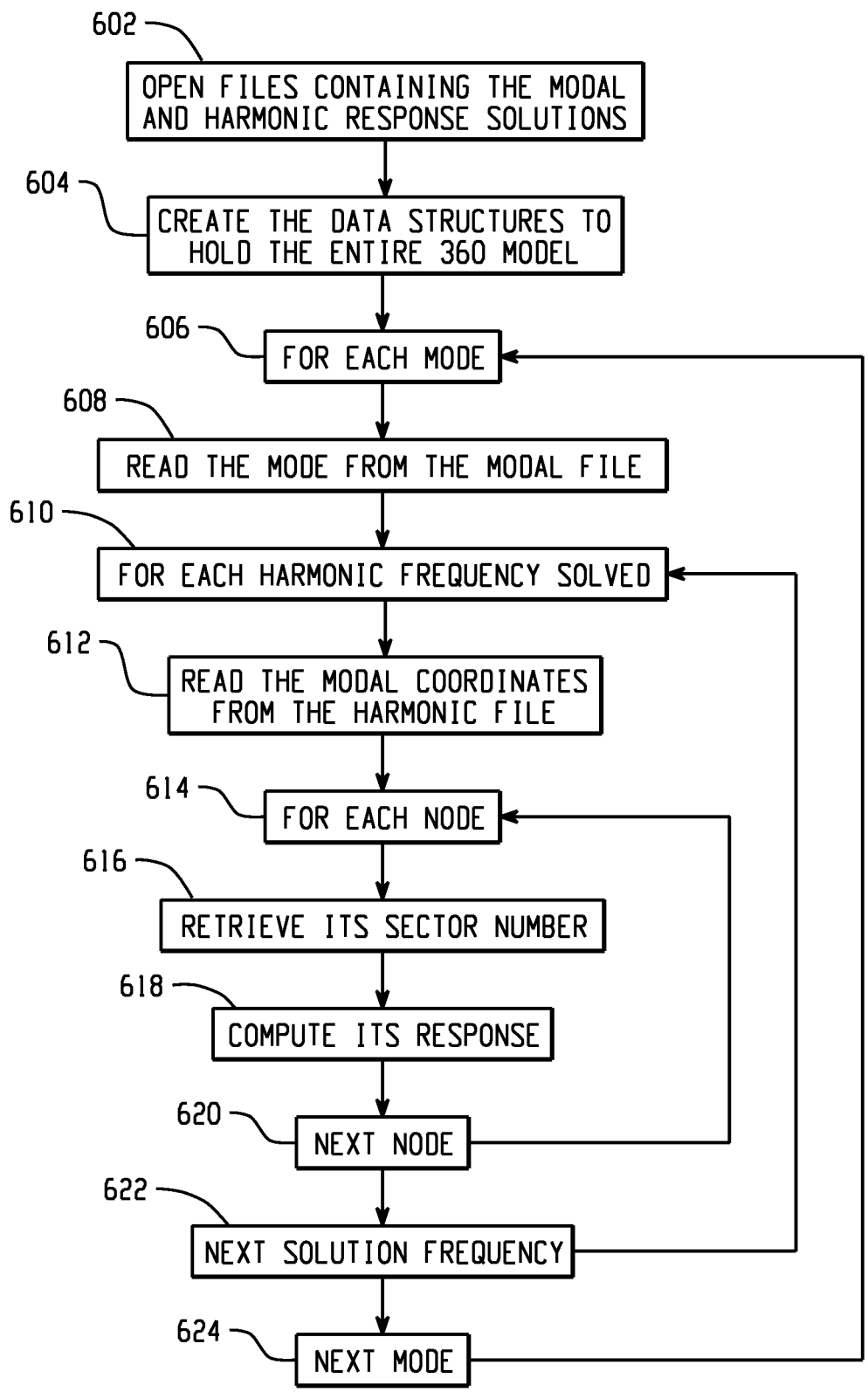
FIG. 6 is a flow diagram depicting an example process for expanding a forced harmonic analysis to an entire model.

In one example, the solution to the forced harmonic analysis at 422 consists of modal coordinates (e.g., factors apply to the cyclic mode shapes from the preceding modal analysis that when summed define the displacement response of the cycle sector). In one embodiment, this response can then be expanded to the entire model as illustrated in FIG. 6. FIG. 6 is a flow diagram depicting an example process for expanding a forced harmonic analysis to an entire model. At 602, a modal solution (e.g., mode shapes) and modal coordinates, the results from the forced harmonic response process, are accessed, such as from a binary file. The data accessed at 602 is only associated with a single sector of a rotating geometry (e.g., a single blade of an entire turbine). At 604, a data structure is generated to hold geometry and solutions for the full rotating geometry. At 606-608, the modes that contribute to the response are looped through, and for each mode, the mode shapes are accessed. A next loop at 610-612 processes each response frequency, reading its modal coordinates. At 614-618, each node in the 360 degree model is processed, and based on its sector location and the mode type, a mode combination is performed, with both real and imaginary solutions being accumulated simultaneously. Following completion of the process of FIG. 6, the harmonic response solution for the entire 360 degree model is in memory and can be graphically displayed. In this manner, displacements, stresses, and strains of the 360 degree configuration can be processed on demand.

Figure 7:
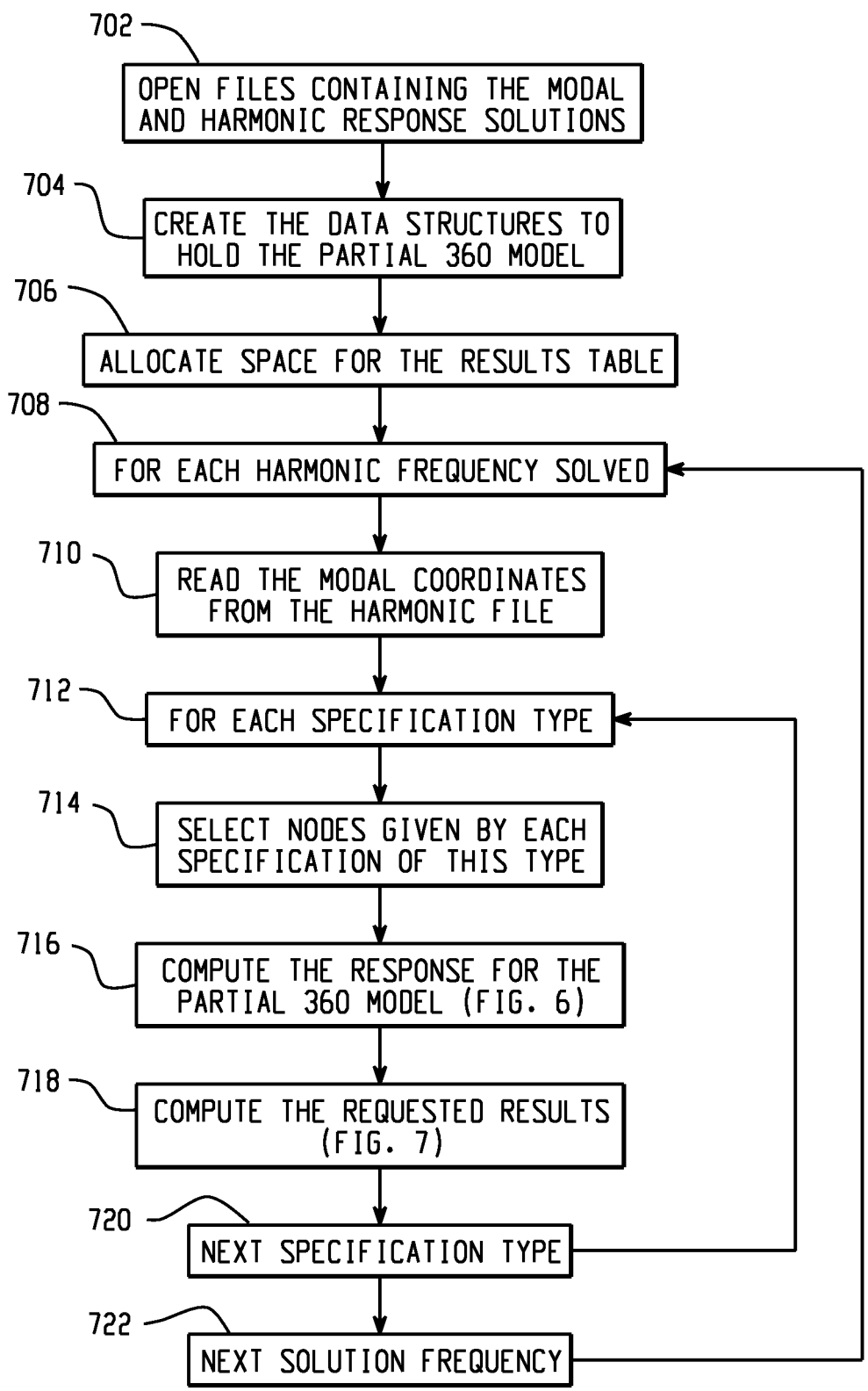
FIG. 7 is a block diagram depicting a process for determining maximum displacements, stresses, or strains.

FIG. 7 is a block diagram depicting a process for determining maximum displacements, stresses, or strains. While the process of FIG. 6 determines the response for all rotating result components, such computations can be expensive and not amenable to iterative simulations, such as Monte Carlo simulations. FIG. 7 depicts a more efficient process for determining maximum displacements, stresses, and/or strains. A user identifies a list of results of interest as a list of specifications. Each specification has the location of interest (e.g., a root of a turbine blade) and a type of quantity to evaluate. The location may be a particular node or a general area (e.g., a blade fillet, an entire blade surface). An area identification may be advantageous in identifying maximum values, where the location of those maximum values is not known before hand. The type of quantity to be accessed, in one example, includes displacement, stress, or strain including category of interest, where the category includes their component value as well as the sum, equivalent, and principle value. In one embodiment, the maximum magnitude over the vibratory motion is always computed.

At 702, a modal solution (e.g., mode shapes) and modal coordinates, the results from the forced harmonic response process, are accessed, such as from a binary file. The model in memory at 702 consists only of a cyclic sector (e.g., data associated with a single turbine blade). Data structures are generated at 704 to hold the geometry and solution for the full 360 degree model, where only the geometry contained in the locations of interest is actually inserted into the data structure at 704. This can result in a significant reduction in memory and computation time compared to storing the entire model as described with respect to FIG. 6. At 706, space for containing the table of results is allocated, where subsequent calculations will write to this table, with data from this table eventually being outputted for consideration by a user or additional downstream processing. At 708-710, each response frequency is processed by accessing its modal coordinates. At 712-718, an inner loop iterates over each specification type. In one example, all displacement specifications are processed together, followed by the stress specifications, followed by the strain specifications. Such an ordering can result in efficient memory and I/O as each result type is only read, computed, and stored once. For each specification of that type, the node locations of interest are selected, forming a superset of all of their nodes. The response for that type and for those nodes is then computed, an example of such process being described with regard to FIG. 8. The computed response is then used to compute the requested result quantities, an example of such process being described with regard to FIG. 9.

Figure 8:
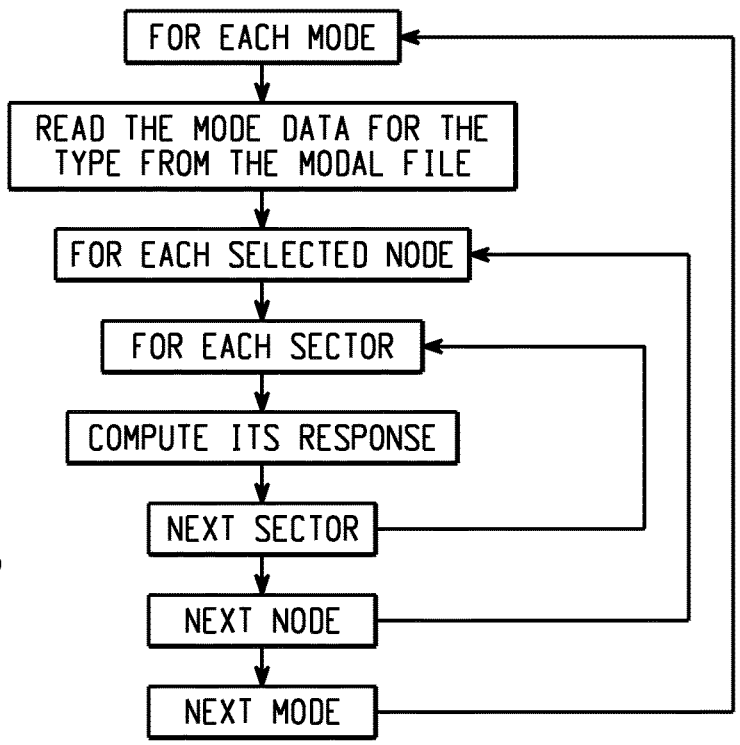
FIG. 8 is a flow diagram depicting an example process for determining the response for a given result type and a set of selected nodes.

FIG. 8 is a flow diagram depicting an example process for determining the response for a given result type and a set of selected nodes. The modes that contribute to the response are looped through, and for each mode, the mode shapes are read. Only the data of the requested type is read, which can result in significant I/O savings. Looping through only the selected nodes and then through each of the sectors, the response for the entire 360 degree model is obtained for those nodes and that result type.

Figure 9:
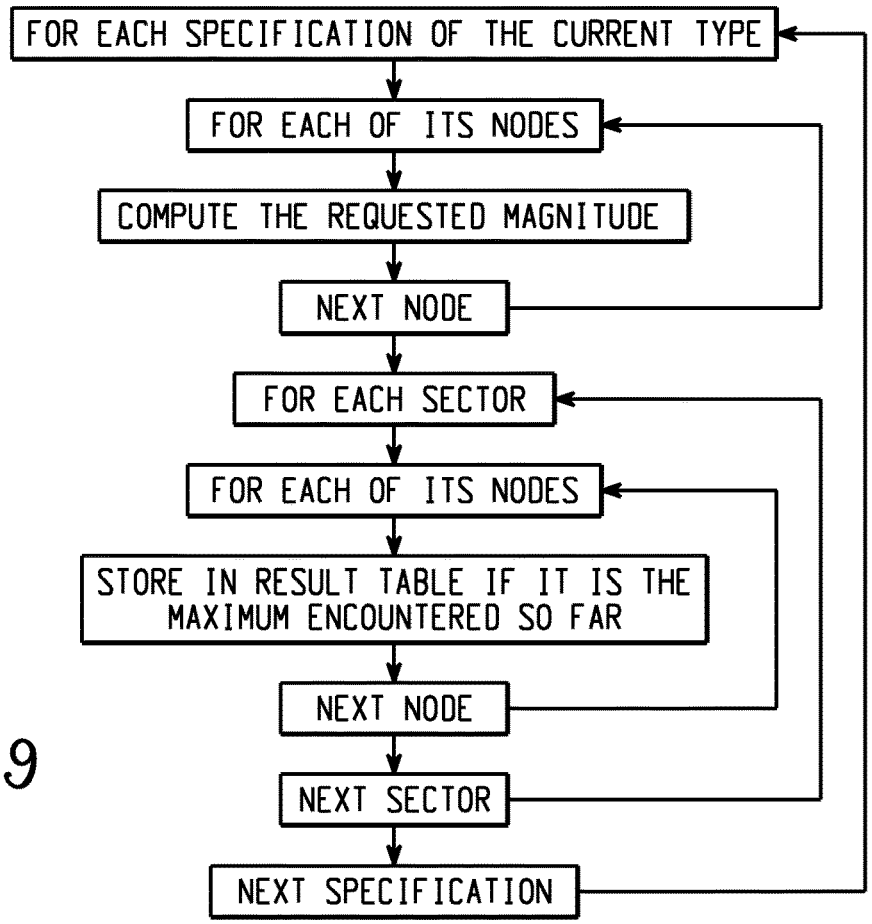
FIG. 9 is a flow diagram depicting an example process for using the computed response to compute requested result quantities.

FIG. 9 is a flow diagram depicting an example process for using the computed response to compute requested result quantities. Given basic results computed as described herein (e.g. real and imaginary results), such as described above with reference to FIG. 8, for the selected nodes of that type, the maximum results for the requested items can be evaluated as depicted in FIG. 9. Each of the user's specifications of the current type (e.g., displacement, stress, strain) is looped through in a first loop. A second loop iterates through each of the locations (e.g., nodes) and computes the requested magnitude. For component values, that magnitude can be determined via a square root sum of squares operation on the real and imaginary values. For equivalent or principal values, such magnitudes can be computed via a phase sweep through a 360 degree cycle of motion to extract the maximum. Specifically, each sector is looped through, along with each sector's nodes, with the current value being compared to the current maximum, with the current value being stored as the current maximum if it is larger.

Figure 10:
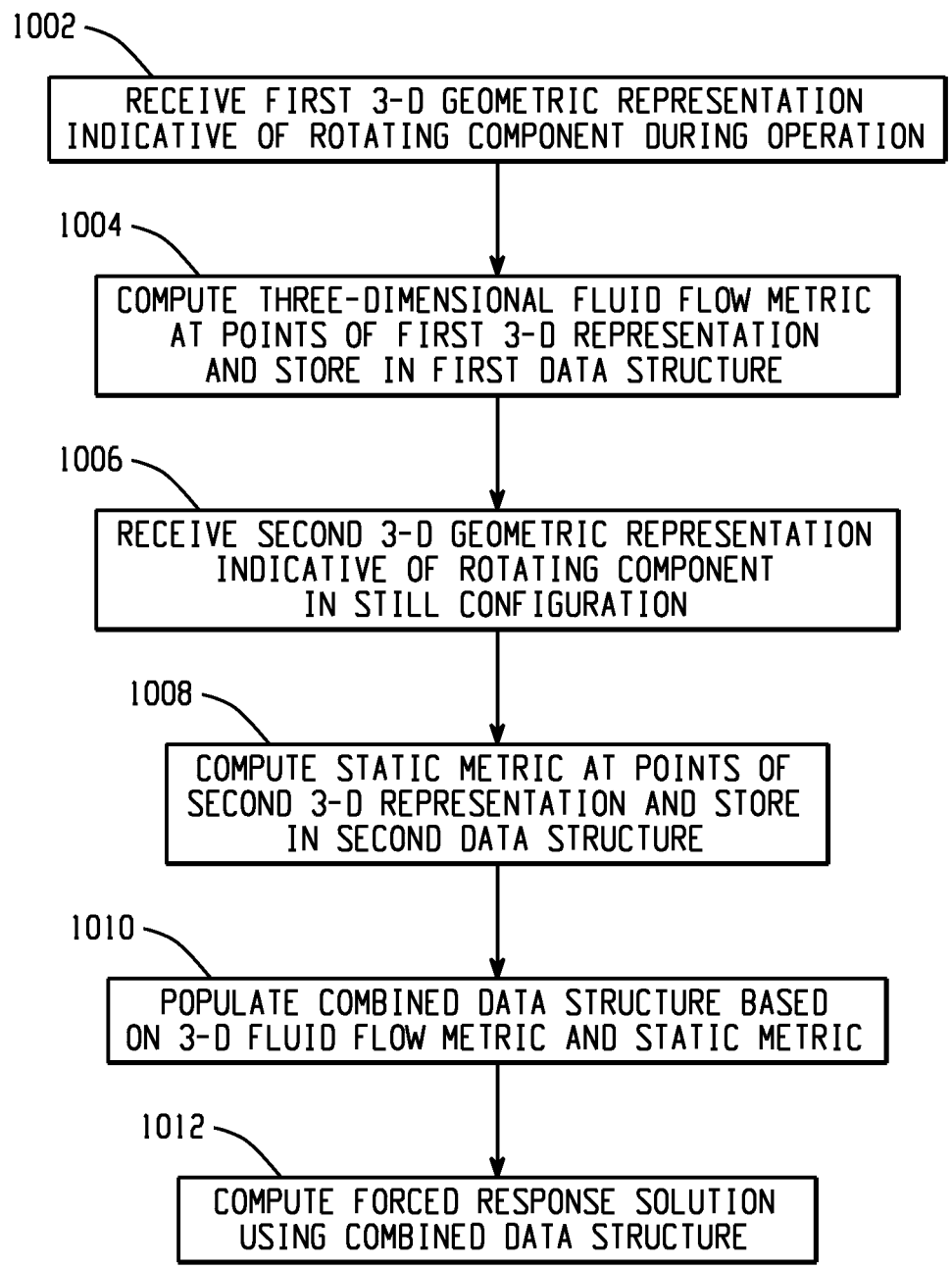
FIG. 10 is a flow diagram depicting a method for simulating high-cycle fatigue of a rotating component.

FIG. 10 is a flow diagram depicting a method for simulating high-cycle fatigue of a rotating component. At 1002, a first three-dimensional geometric representation of a rotating component is received, where the first three-dimensional geometric representation is indicative of the rotating component during operation. At 1004, a three-dimensional fluid flow metric is computed at points of the first three-dimensional geometric representation based on the first three-dimensional geometric representation and stored in a first data structure. At 1006, a second three-dimensional geometric representation of the rotating component is received, where the second three-dimensional geometric representation is indicative of the rotating component in a still configuration. At 1008, a static metric is computed at points of the second three-dimensional geometric representation based on the second three-dimensional geometric representation and stored in a second data structure. At 1010, a combined data structure is populated based on the three-dimensional fluid flow metric from the first data structure and the static metric from the second data structure. At 1012, a forced response solution indicative of high-cycle fatigue of the rotating component is computed using the combined data structure.

This application uses examples to illustrate the invention. The patentable scope of the invention includes other examples.

It is claimed:

1. A computer-implemented method of simulating high-cycle fatigue of a rotating component, comprising:
   receiving a first three-dimensional geometric representation of a rotating component extracted from a physical embodiment of the rotating component, wherein the first three-dimensional geometric representation is indicative of the rotating component during operation;
   computing a three-dimensional fluid flow metric at points of the first three-dimensional geometric representation based on the first three-dimensional geometric representation and storing the three-dimensional fluid flow metric in a first data structure;
   receiving a second three-dimensional geometric representation of the rotating component extracted from the physical embodiment of the rotating component, wherein the second three-dimensional geometric representation is indicative of the rotating component in a still configuration,
   computing a static metric at points of the second three-dimensional geometric representation based on the second three-dimensional geometric representation and storing the static metric in a second data structure;
   performing a prestressed static analysis and a linear perturbation analysis on the second three-dimensional geometric representation, the prestressed static analysis based on both of an operating temperature and operating rotation speed;
   updating the second data structure based on the prestressed static analysis and the linear perturbation analysis;
   mapping points of the first three-dimensional geometric representation to points of the second three-dimensional geometric representation;
   populating a combined data structure based on the three-dimensional fluid flow metric from the first data structure and the static metric from the second data structure according to said mapping; and
   computing a forced response solution indicative of high-cycle fatigue of the rotating component using the combined data structure, the forced response solution comprising modal coordinates and being based on a combined result of the three-dimensional fluid flow metric and the static metric.

2. The method of claim 1, wherein the forced response solution is computed based on multiple combined data structures, each combined data structure indicative of an individual rotating component of a system of rotating components, wherein the forced response solution is based on interactions among three-dimensional fluid flow metrics of the multiple individual rotating components.

3. The method of claim 2, further comprising:
   determining a second forced response solution based on combined data structures associated with a different combination of rotating components.

4. The method of claim 2, wherein different ones of the rotating components differ in geometry or wear.

5. The method of claim 1, further comprising:
   populating the combined data structure based on a three-dimensional fluid flow metric from the first data structure and the static metric from the second data structure for a second rotating component having a different first three-dimensional geometric representation and a different second three-dimensional geometric representation; and computing a second forced response solution indicative of high-cycle fatigue of the second rotating component using the combined data structure.

6. The method of claim 5, further comprising:
populating the combined data structure and computing additional forced response solutions for multiple additional variations of the rotating component as part of a Monte-Carlo simulation.

7. The method of claim 1, wherein the rotating component is a blade of an engine turbine.

8. The method of claim 1, wherein the three-dimensional fluid flow metric is based on air or water flowing over the first three-dimensional representation of the rotating component.

9. The method of claim 1, wherein during operation, the rotating component is rotating and heated above room temperature.

10. The method of claim 1, wherein in the still configuration, the rotating component is not rotating and is at room temperature.

11. The method of claim 1, wherein the combined data structure is the second data structure including incorporated data from the first data structure.

12. The method of claim 1, wherein the modal coordinates comprise factors to apply to cyclic mode shapes from a preceding modal analysis which, when summed define a displacement response of a cycle sector; and wherein the method further comprises:
determining a displacement response for a system comprising a plurality of rotating components based on the forced response solution.

13. The method of claim 12, wherein the displacement response is computed for all points of the system.

14. The method of claim 12, wherein the displacement response is computed for points of the system identified in a points of interest data structure.

15. The method of claim 12, further comprising:
determining a location of maximum response for the system based on the displacement response for the system.

16. A computer-implemented system for simulating high-cycle fatigue of a rotating component, comprising:
one or more data processors;
one or more computer-readable mediums encoded with:
a first three-dimensional geometric representation data structure associated with a rotating component extracted from a physical embodiment of the rotating component, wherein the first three-dimensional geometric representation data structure is indicative of the rotating component during operation;
a second three-dimensional geometric representation data structure associated with the rotating component extracted from the physical embodiment of the rotating component, wherein the second three-dimensional geometric representation data structure is indicative of the rotating component in a still configuration;

instructions for commanding the one or more data structures to perform steps including:
computing a three-dimensional fluid flow metric at points of the first three-dimensional geometric representation based on the first three-dimensional geometric representation data structure and storing the three-dimensional fluid flow metric in a first data structure;
computing a static metric at points of the second three-dimensional geometric representation based on the second three-dimensional geometric representation data structure and storing the static metric in a second data structure;
performing a prestressed static analysis and a linear perturbation analysis on the second three-dimensional geometric representation, the prestressed static analysis based on both of an operating temperature and operating rotation speed;
updating the second data structure based on the prestressed static analysis and the linear perturbation analysis;
mapping points of the first three-dimensional geometric representation to points of the second three-dimensional geometric representation;
populating a combined data structure based on the three-dimensional fluid flow metric from the first data structure and the static metric from the second data structure; and
computing a forced response solution indicative of high-cycle fatigue of the rotating component using the combined data structure, the forced response solution comprising modal coordinates and being based on a combined result of the three-dimensional fluid flow metric and the static metric.

17. The system of claim 16, wherein the forced response solution is computed based on multiple combined data structures, each combined data structure indicative of an individual rotating component of a system of rotating components, wherein the forced response solution is based on interactions among three-dimensional fluid flow metrics of the multiple individual rotating components.

18. The system of claim 17, wherein the steps further comprise:
determining a second forced response solution based on combined data structures associated with a different combination of rotating components.

19. The system of claim 17, wherein different ones of the rotating components differ in geometry or wear.

20. The system of claim 16, wherein the steps further comprise:
populating the combined data structure based on a three-dimensional fluid flow metric from the first data structure and the static metric from the second data structure for a second rotating component having a different first three-dimensional geometric representation and a different second three-dimensional geometric representation; and
computing a second forced response solution indicative of high-cycle fatigue of the second rotating component using the combined data structure.

* * * * *